Dec. 25, 1962  J. W. McCOLLUM  3,070,175
BEET HARVESTER LIFTING WHEEL ADJUSTMENT
Filed Aug. 4, 1960
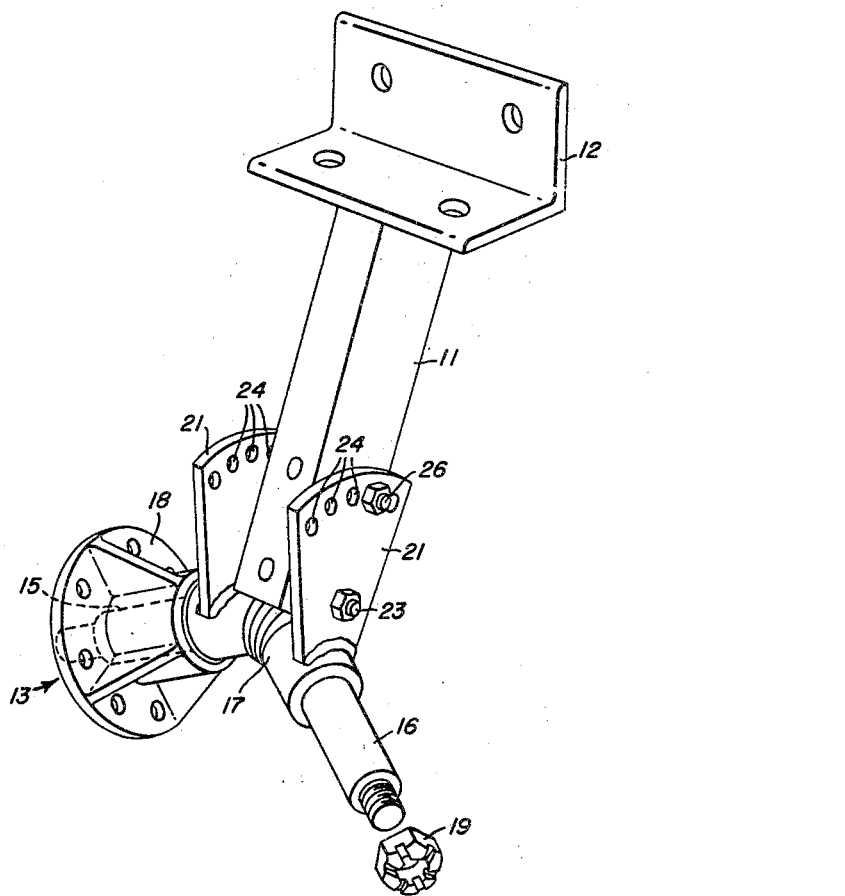
INVENTOR.
JACK W. MC COLLUM
BY
Roger C. Johnson
ATTORNEY

United States Patent Office 3,070,175
Patented Dec. 25, 1962

1

3,070,175
BEET HARVESTER LIFTING WHEEL ADJUSTMENT
Jack W. McCollum, Boise, Idaho, assignor to Deere & Company, Moline, Ill., a corporation of Delaware
Filed Aug. 4, 1960, Ser. No. 47,479
3 Claims. (Cl. 171—58)

This invention relates generally to agricultural implements and more particularly to harvesters for root crops, such as sugar beets, for example.

The object and general nature of this invention is the provision of means for adjusting the position of the beet lifting wheels of a beet harvester of the type having angled lifter wheels for pulling or digging beets from the ground. For example, U.S. Patent 2,682,739, issued July 6, 1954, to Bozeman et al. discloses a beet harvester of the type including angled beet lifting lifting wheels, and one of the principal objects of this invention is the provision of means providing for changing the angle of the beet lifter wheels or disks relative to the ground about a generally transverse axis. A further object of this invention is the provision of a spindle and shank assembly in which the angularly related spindles may be rotated as a unit with respect to the shank while retaining the desired angular relationship of one disk or wheel relative to the other.

Still further, another feature of this invention is the provision of means fixing the spindle assembly in desired relation with respect to the shank so as to retain the desired adjustment.

These and other objects and advantages of this invention will be apparent to those skilled in the art after a consideration of the following description of the preferred embodiment, taken in conjunction with the accompanying drawing, in which the single FIGURE is a perspective of a spindle and shank assembly constructed according to the principles of this invention.

Referring now to the drawing, the spindle and shank assembly of this invention is illustrated as incorporating a generally vertical elongated bar 11 forming a shank for a beet harvester of the type shown in the above mentioned patent. Secured to the upper end of the shank is an angle 12 apertured as shown so as to accommodate means to fix the assembly to the frame of the beet harvester.

The spindle unit is indicated at 13 and comprises a pair of spindles 15 and 16 fixed in a predetermined angular relation with respect to a central interconnecting portion 17 that, as shown, extends generally transversely of the shank at its lower end, the connecting portion lying immediately below the lower end of the shank. The beet lifter wheels adapted to be mounted on the spindles 15 and 16 may take the form shown in the above-mentioned patent, and are represented by the wheel hub shown at 18. Each wheel is held on the associated spindle by means of a castellated nut 19 and the usual cotter or other suitable retaining means.

Secured to the interconnecting spindle section 17 is a pair of sector plates 21 arranged in axially spaced apart parallel relation. The spacing is such that the lower end of the shank is received snugly therebetween. Preferably the lower ends of the sector plates are welded to the spindle section 17, which may be a casting. The sector plates 21 are apertured adjacent their lower ends to receive a pivot bolt 23, which forms the transverse axis about which the spindle unit 13 may swing relative to the shank 11. Also, the outer portion of each sector plate

2

21 is provided with a series of arcuately arranged openings 24, the openings 24 in one sector being aligned, respectively, with the openings 24 of the other sector. The lower end of the shank is apertured to receive the pivot bolt 23 and, in addition, the shank is also apertured above the bolt 23 to receive a bolt 26 that passes through selected openings in the upper portions of the sector plates 21 for locking the sector plates in selected position.

The bolt 26 is removable and by taking the bolt 26 out, shifting the spindle unit to a new position and then reinserting the bolt 26, the angle that the beet lifter wheels make with the ground may be varied, as desired.

While I have shown and described above the preferred structure in which the principles of this invention have been incorporated it is to be understood that widely different means may be utilized in the practice of the broader aspects of my invention.

What I claim and desire to secure by Letters Patent is:

1. A spindle and shank assembly for beet harvesters having angled lifting wheels, a generally vertical shank, the upper portion being attachable to the beet harvester, a spindle unit comprising a pair of angularly related spindles adapted to receive the associated lifter wheels and a generally central section to which said spindles are fixed in angular relation, and pivot means extending generally transversely relative to said shank for adjustably connecting said spindle unit with the lower portion of said shank.

2. A spindle and shank assembly for beet harvesters having angled lifter wheels, comprising an elongated shank member having an aperture adjacent one end, a spindle unit adapted to receive said lifter wheels and including a pair of angularly related spindles and a central section, a pair of sector plates fixed to said central section in axially spaced apart relation, means pivotally connecting said spindle unit to said shank member, said means extending through the opening in said shank end, and means fixing said spindle unit to said shank, said latter means extending through said sector plates and the adjacent portion of said shank.

3. A spindle and shank assembly for a beet harvester having angled beet lifter wheels, said assembly comprising a normally generally vertical shank, a generally transverse spindle unit including a pair of outwardly extending angularly related wheel receiving spindles and a generally central interconnecting section, a pair of plate sections fixed to said central section and extending therefrom in spaced apart generally parallel relation, each of said plate sections including a series of arcuately arranged openings and an inner central opening, the openings in one section being aligned, respectively, with the corresponding openings of the other section, pivot means extending through the aligned inner openings and through an opening in the lower end portion of said shank, and removable bolt means extending through said shank and selected openings of the arcuate series of openings in said plate sections for fixing the spindle unit to the shank in adjusted position relative thereto.

References Cited in the file of this patent

UNITED STATES PATENTS 1,182,149  Douglass _____ May 9, 1916

FOREIGN PATENTS 261,878  Great Britain _____ Dec. 2, 1926

UNITED STATES PATENT OFFICE
CERTIFICATE OF CORRECTION

Patent No. 3,070,175                                December 25, 1962

Jack W. McCollum

It is hereby certified that error appears in the above numbered patent requiring correction and that the said Letters Patent should read as corrected below.

In the grant, lines 1 and 2, and in the heading to the printed specification lines 4 and 5, for "assignor to Deere & Company", each occurrence, read -- assignor of one-half to Deere & Company --; in the grant, line 12, for "Deere & Company, it successors" read -- Jack W. McCollum, his heirs or assigns, and Deere & Company, its successors --.

Signed and sealed this 9th day of July 1963.

(SEAL)
Attest:

ERNEST W. SWIDER                                DAVID L. LADD
Attesting Officer                                Commissioner of Patents